Nov. 26, 1968  F. E. STUART, SR  3,412,863

FILTER BED AGITATOR AND METHOD

Filed June 11, 1963

INVENTOR
FRED E. STUART, SR.
BY Toulmin & Toulmin
ATTORNEYS

United States Patent Office 3,412,863
Patented Nov. 26, 1968

3,412,863
FILTER BED AGITATOR AND METHOD
Fred E. Stuart, Sr., 516 N. Charles St.,
Baltimore, Md. 21201
Filed June 11, 1963, Ser. No. 286,978
7 Claims. (Cl. 210—80)

This invention relates to improvements in filtering systems, and more particularly to revolvable filter bed agitators for use in cleaning filter beds.

The invention provides an improved filter bed agitator which requires less wash water and is more efficient than conventional agitators which use large volumes of wash water.

In accordance with the present invention, enhanced agitation and efficacious cleaning action is obtained by utilizing a revolvable tubular agitator arm which is equipped with multiple sets of nozzles, one set being arranged to deliver jets of wash water in the filter bed upwardly at a small angle to the horizontal, while another set is positioned to deliver water downwardly in the bed at a small angle to the horizontal.

Wash water is fed into the hollow revolvable agitator arm and discharged from the nozzles which are arranged in spaced relationship along the length of the agitator arm. High velocity jets of wash water are applied to the upper portion of the filter bed as the agitator arm revolves through the filter medium near the surface of the filter bed. The filter medium is preferably composed of fine sand and/or particles of charcoal or mixtures of solid particles and such as conventionally used in filter beds. The agitator arm comprises two sets of nozzles arranged at different angles with respect to the agitator arm, and spaced along the length of the arm, one set of nozzles being positioned to direct jets of water upwardly and the other set arranged to direct like jets of water downwardly. The filter bed is thus agitated with high velocity jet streams of water concurrently and over the entire upper surface layer of the filter bed. An alternate arrangement of the nozzles is employed to direct a jet stream of water from one nozzle in a plane extending downwardly at an angle of approximately 15° to the horizontal while the adjacent nozzle delivers a jet stream of water in a plane extending upwardly at an angle of about 15° to the horizontal.

Like nozzles located at the opposite ends of the revolving agitator arm direct jet streams of water outwardly therefrom at different angles to provide a thorough cleaning action over the entire upper layer of the filter bed. In this manner the foreign matter which collects on the filter bed is separated from the filter medium. The foreign matter thus separated from the filter medium is drawn off with waste water and the cleaned sand or filter medium returned to the filter bed for reuse.

The alternate arrangement of the nozzles on the revolving agitator arm provides a filter sweeping action which results in a maximum agitation of the filter bed. This is the principal object of the present invention.

Other objects and advantages of the invention will be apparent from the following description of a preferred embodiment of the invention and taken in conjunction with the drawings wherein.

Figure 1:
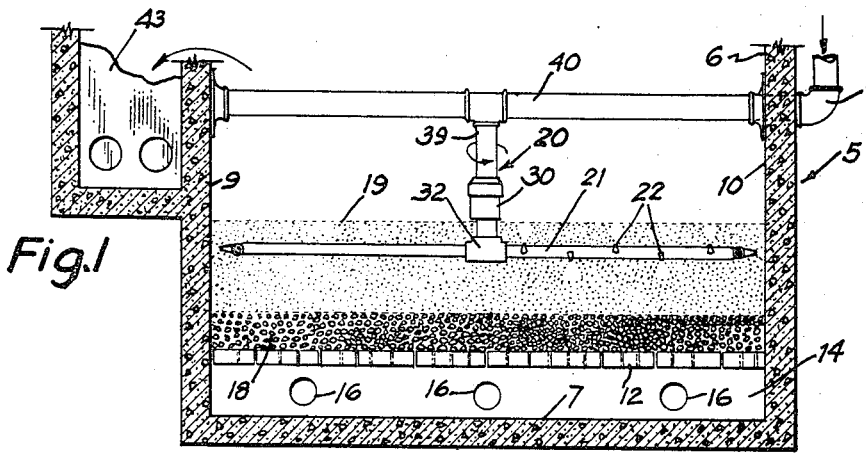
FIGURE 1 is a vertical sectional view taken through a filter bed and illustrating the use of my rotating or revolving multiple jet agitator.

Referring to the drawings in more detail, reference character 5 designates a filter bed of any desired size and dimensions and which may constitute one or more filter bed units of a water filtration plant. The filter bed 5, as illustrated in FIGURE 1, comprises a concrete tank 6 having a bottom wall 7 and side walls 9 and 10. Intermediate the top and bottom wall of the tank is a perforated wall 12 extending between the side walls 9 and 10 and defining a well 14 therebeneath for filtered water. Conduits 16 communicate with the well 14 for drawing off filtered water which has passed through the filter bed. The filter medium of the filter bed consists of coarse gravel 18 and an upper layer 19 consisting of fine particles such as sand or the like as aforementioned.

Figure 2:
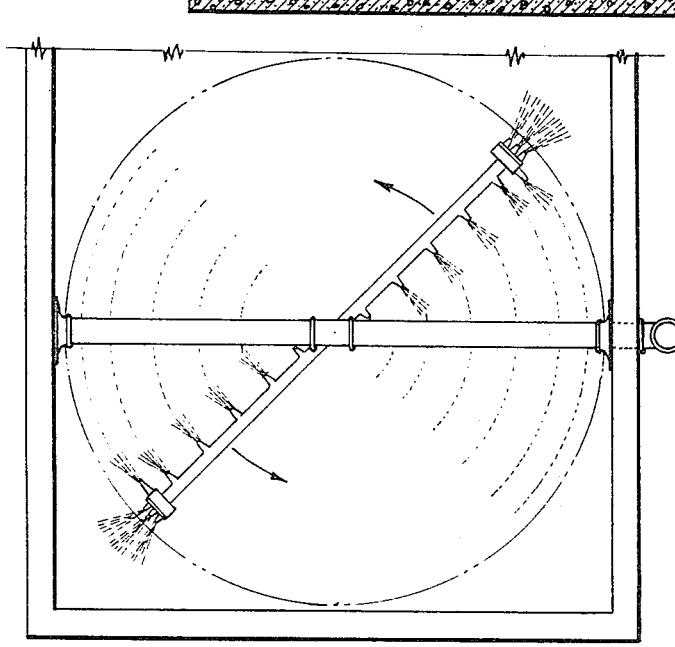
FIGURE 2 is a plan view of a filter bed shown in FIGURE 1, and illustrating the multiple jet and sweeping action of the revolving agitator arm of this invention.
Figure 3B:
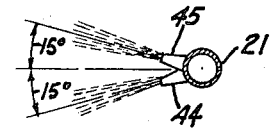
FIGURE 3b is a sectional view taken on line 3b—3b of FIGURE 3a and looking in the direction of the arrows.
Figure 3:
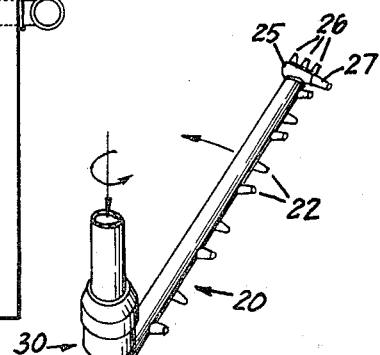
FIGURE 3 is an enlarged detail view in perspective illustrating the alternate angular arrangement of the nozzle jets on the revolvable agitator arm.
Figures 3A, 4:
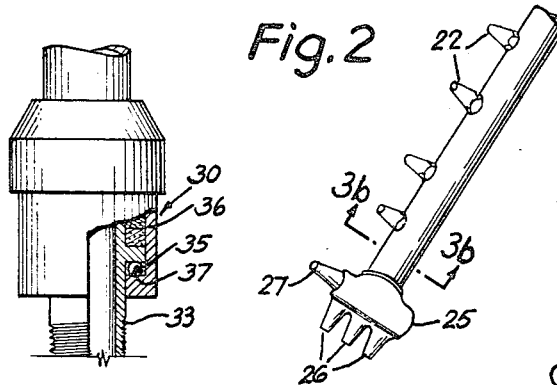
FIGURE 3a is a fragmentary view in perspective illustrating the multi-nozzle fitting disposed at opposite ends of the agitator arm.
FIG. 4 is an enlarged view with parts broken off showing the bearing assembly.

Mounted for rotation in the filter bed 5 is a revolvable agitator arm means or unit, generally designated 20. The agitator arm means 20 illustrated in FIGURES 2 and 3 consists of an inverted T structure, as shown, and comprising an elongated pipe 21 equipped with nozzles, generally designated 22. The nozzles preferably are threaded into the pipe 21 and may of different sizes as desired. At opposite ends of the pipe 21 is a fitting 25 having four nozzles. Three nozzles 26, as illustrated in FIGURES 2 and 3a are arranged to deliver jets of water laterally and outwardly from the opposite ends of the agitator arm and at an angle of 15° to the horizontal. A nozzle 27 attached to the fitting is arranged to deliver a jet stream of water in the same general direction as the adjacent nozzle on the pipe 21, as shown in FIGURE 3a.

To cause the agitator arm 20 to revolve counterclockwise, as illustrated by the arrows in FIGURE 2, the nozzles along one radius of the arm are arranged to deliver jets of water in one direction while along the opposite radius of the agitator arm the nozzles are arranged to discharge jets of water in the opposite direction. The reaction forces thus add together to cause the agitator arm to revolve about a central vertical axis as shown in FIGURE 2.

The agitator arm 21 is carried at its central portion on a ball bearing assembly 30, the agitator arm being connected to the assembly by a T pipe section 32 and threaded nipple 33. The weight of the revolving agitator arm 20 is supported on the bearing assembly 30, the latter comprising stainless steel balls 35 contained in a brass shell 36, and stainless steel wearing plate 37. The agitator arm and bearing assembly are connected through a pipe 39 to a cross pipe 40 which is secured at its opposite ends to the tank walls 9 and 10 respectively. Wash water is supplied under pressure from a suitable source through the pipe 42 which communicates with the pipe 40 and hence to the revolvable agitator arm where the water is discharged from the nozzles 22 in jet streams.

The agitator arm 20 is connected to the water line 42 and caused to revolve by the jet reaction forces developed at the nozzles. Rotation of the agitator arm and jet washing of the filter bed is carried out concurrently during back washing of the filter bed. The resultant agitation and washing action separate the foreign matter from the filter medium which foreign matter is flushed away over the wall 9 into the waste drain 43 as indicated by the arrow in FIGURE 1.

The water pressure and reaction forces developed as the water is discharged from the nozzles causes the agitator arm 21 to revolve about its ball bearing assembly 30. A water pressure of 55–100 p.s.i. and discharging approximately one-half gallon of water from the revolving agitator arm nozzles per minute per square foot of filter space provides a satisfactory operation. By arranging adjacent nozzles, such as shown at 44 and 45 in FIGURE 3b, whereby the jet streams of water are delivered at an angle of 30° with respect thereto and at an angle of 15° above and 15° below a horizontal plane disposed centrally between the nozzles, a thorough agitation and washing of the filter bed is accomplished.

During operation of the filter system to clean and wash the filter bed, clean wash water is introduced under pressure to the agitator arm which is revolved by the reaction forces created by water discharging from the nozzles of the agitator arm.

A suitable rotation speed of the agitator arm is 4 to 7 r.p.m. with the agitator arm arranged just beneath the surface of the filter bed medium. The velocity of water as it is discharged from the nozzles preferably should approximate 75 miles an hour. The resultant multiple jet angular disposed action of the jets of water provides maximum agitation and cleaning action of the filter medium.

The invention, as heretofore pointed out, is adapted to wash the filter medium with a minimum amount of water. Wash water under a pressure of 40–125 pounds per square inch is directed beneath and upwards of the surface of the sand. This part of the filter bed collects foreign matter. Utilizing the revolving agitator of the invention, the filter bed is expanded and agitated thoroughly during the jet action so that the foreign material is dislodged and washed from the surface of the sand particles and removed providing a clean filter bed.

In accordance with the invention, the rotating jet agitator, as illustrated in the drawing, may comprise a plurality of such agitators in a large filter bed. The size and number of jet agitators, of course, depends upon the area of the filter sand treated.

All the bearings in the agitator arm are water lubricated to eliminate entrance of sand or foreign matter. A preferred agitator operation and one found to be most satisfactory is one operating at about 55–100 pounds per square inch, and which requires approximately one-half gallon per minute per square foot of filter space as the wash water.

It will be understood that this invention is susceptible to modification in order to adapt it to different usages and conditions and, accordingly, it is desired to comprehend such modifications within this invention as may fall within the scope of the appended claims.

What is claimed is:

1. Agitator mechanism for washing and cleaning the filter medium of a filter bed, said mechanism comprising a revolving tubular agitator arm equipped with nozzles which are spaced longitudinally of said arm, said agitator arm being mounted in a horizontal plane near the top of the filter bed, a source of wash water under pressure connected to said agitator arm to cause high velocity jets of water to discharge from said nozzles, alternate ones of said nozzles forming a first group thereof being arranged to deliver jets of wash water upwardly from a horizontal plane in said filter bed and at a small angle to the horizontal, and others of said nozzles between and adjacent the nozzles of said first group and forming a second group thereof being arranged to deliver jets of wash water downwardly from a horizontal plane in said bed at a small angle to the horizontal whereby a substantial depth of the filter bed is agitated and washed with high velocity jet streams of water directed at different angles with respect to a horizontal plane.

2. Agitator mechanism for washing and cleaning filter beds as set out in claim 1, in which the nozzles of said first group are arranged to deliver jets of water upwardly at an angle of substantially 15° to the horizontal and the nozzles of said second group of nozzles being arranged to deliver jets of water downwardly at an angle of substantially 15° to the horizontal.

3. Agitator mechanism for washing and cleaning the filter medium of a filter bed, said mechanism comprising a revolving tubular agitator arm equipped with nozzles which are spaced longitudinally of said arm, said agitator arm being mounted in a horizontal plane near the top of the filter bed, a source of wash water under pressure connected to said agitator arm to cause high velocity jets of water to discharge from said nozzles, one group of said nozzles being arranged to deliver jets of wash water upwardly in said filter bed and at a small angle to the horizontal, and another group of nozzles alternating with the nozzles of the first group being arranged to deliver jets of wash water downwardly in said bed at a small angle to the horizontal whereby a substantial depth of the filter bed is agitated and washed with high velocity jet streams of water directed at different angles with respect to a horizontal plane, said agitator arm being supported at its central portion on a ball bearing assembly and adapted to be revolved about said bearing by the jet force created by said jets of water discharged from said nozzles, said bearing being lubricated by the water supply to said agitator arm.

4. Agitator mechanism for washing and cleaning filter beds as set out in claim 3, characterized in that said agitator arm is disposed beneath the surface of said filter medium of the filter bed and revolves at a speed of from 4 to 7 r.p.m.

5. A method of washing and cleaning a filter bed comprising loose particles of filter material comprising agitating and washing said filter material by subjecting the same to the action of rotating jets of wash water directed within the filter bed and directing some of said jets of water upwardly at an angle of about 15° to the horizontal and others of said jets of water downwardly at about an angle of 15° to the horizontal.

6. A method of washing and cleaning a filter bed comprising loose particles of filter material comprising agitating and washing said filter material by subjecting the same to the action of rotating jets of wash water directed within the filter bed and directing alternate ones of said jets of water upwardly at an angle of about 15° to the horizontal and the others of said jets of water downwardly at about an angle of 15° to the horizontal, and delivering said jets of water at a velocity of about 75 miles per hour.

7. A method of washing and cleaning a filter bed comprising loose particles of filter material comprising agitating and washing said filter material by subjecting the same to the action of rotating jets of wash water directed within the filter bed and directing alternate ones of said jets of water upwardly at an angle of about 15° to the horizontal and the others of said jets of water downwardly at about an angle of 15° to the horizontal, simultaneously causing water to flow upwardly through the entire filter bed for backwashing the filter bed.

References Cited

UNITED STATES PATENTS

| 2,309,916 | 2/1943 | Palmer | 210—272 X |
| 3,039,612 | 6/1962 | Palmer et al. | 210—272 |

REUBEN FRIEDMAN, *Primary Examiner.*

S. ZAHARNA, *Assistant Examiner.*